US012800490B2

(12) United States Patent
Shibakawa

(10) Patent No.: US 12,800,490 B2
(45) Date of Patent: Nov. 17, 2026

(54) FILTER-PRESS FILTER-CLOTH DAMAGE DETECTION DEVICE

(71) Applicant: ISHIGAKI COMPANY LIMITED, Tokyo (JP)

(72) Inventor: Yusuke Shibakawa, Kagawa (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 740 days.

(21) Appl. No.: 18/226,886

(22) Filed: Jul. 27, 2023

(65) Prior Publication Data

US 2024/0060887 A1 Feb. 22, 2024

(30) Foreign Application Priority Data

Aug. 19, 2022 (JP) ................................ 2022-130857
Aug. 19, 2022 (JP) ................................ 2022-130858

(51) Int. Cl.

| | |
|---|---|
| ***G01N 21/55*** | (2014.01) |
| ***B30B 9/26*** | (2006.01) |
| ***B30B 15/00*** | (2006.01) |
| *G01N 21/84* | (2006.01) |

(52) U.S. Cl.

CPC ............. *G01N 21/55* (2013.01); *B30B 9/265* (2013.01); *B30B 15/00* (2013.01); *G01N 2021/551* (2013.01); *G01N 2021/8405* (2013.01)

(58) Field of Classification Search

CPC .. G01N 22/02; G01N 21/55; G01N 2021/551; G01N 2021/8405; G01N 29/024; G01N 33/36; G01F 23/284; G01F 23/2928; G01F 1/661; G01S 17/08; G01S 17/88; G01S 11/12; G01S 7/4808; G01C 3/06; B01D 35/143; B01D 25/12; B01D 25/164;

(Continued)

(56) References Cited

FOREIGN PATENT DOCUMENTS

| | | | |
|---|---|---|---|
| CN | 113209679 | 8/2021 | |
| CN | 113209679 A * | 8/2021 | ............ B01D 25/21 |
| JP | 58-116005 | 8/1983 | |

(Continued)

OTHER PUBLICATIONS

JP 2013000657 A English description, Jan. 7, 2013, Otani Kazuhisa et al.*

(Continued)

*Primary Examiner* — Akash K Varma
(74) *Attorney, Agent, or Firm* — Greenblum & Bernstein, P.L.C.

(57) ABSTRACT

A filter-press filter-cloth damage detection device for a filter press includes a detection path and a detection device. In the filter press, a filtrate produced by solid-liquid separation operation of a filter cloth nipped between filter plates is discharged into a collection pipe via a filtrate passage of each of the filter plates. The detection path extends in a straight line. A filtrate discharged from each of filtration chambers formed between adjacent filter plates is collected to the detection path. The detection device is configured to transmit, from an end portion of the detection path, an irradiation wave or a pulse that reflects on an interface between a clear filtrate and a filtrate with a prescribed turbidity, convert a propagation time from the transmission until reception of a reflected wave into a distance, and output the distance.

19 Claims, 10 Drawing Sheets

(58) Field of Classification Search
CPC ........ B01D 25/00; B01D 25/21; B30B 9/265; B30B 9/26; B30B 15/00
USPC ........................................................ 210/745
See application file for complete search history.

(56) References Cited

FOREIGN PATENT DOCUMENTS

| | | | | |
|---|---|---|---|---|
| JP | S 58116005 U | * | 8/1983 | ............. B01D 25/12 |
| JP | 2013000657 A | * | 1/2013 | ............. B01D 25/12 |
| JP | 5582359 | | 9/2014 | |

OTHER PUBLICATIONS

JPS 58116005 U English description, Aug. 8. 1983.*
CN 113209679 A English description, Aug. 6, 2021, Wang Weidong et al.*

* cited by examiner

FILTER-PRESS FILTER-CLOTH DAMAGE DETECTION DEVICE

CROSS-REFERENCE TO RELATED APPLICATIONS

The present application is based on and claims the benefit of priority from the prior Japanese Patent Application Nos. 2022-130857 and 2022-130858, both filed on Aug. 19, 2022, the entire contents of which are incorporated by reference herein.

TECHNICAL FIELD

The disclosure relates to a filter-press filter-cloth damage detection device configured to detect which filter cloth is damaged from discharged filtrate in a filter press including a plurality of filtration chambers located side by side.

BACKGROUND

In a conventional filter press, the filtrate produced by solid-liquid separation operation of a filter cloth in each filtration chamber is discharged to an external filtrate tank or the like via a common discharge path provided at an outer portion of each filter plate. Hence, in the case in which a filter cloth is damaged, and a filtrate containing a large amount of suspended matter flows out, the operation is stopped to visually determine the filter cloth of each filtration chamber because which filter cloth is damaged among a large number of filter cloths is unclear. Since it is difficult in the above method to determine which position a damaged filter cloth is located at, it takes long time to make the determination.

If the operation continues without noticing damage of a filter cloth, a sufficient pressure cannot be kept in the filtration chamber having the damaged filter cloth. The pressure applied to the filtration chambers of the entire filter press is imbalanced, which makes it impossible to perform a sufficient dehydration. Since a filtrate containing a large amount of suspended matter is discharged to the outside, the load on the environment increases. In addition, a filtrate containing a large amount of suspended matter from the filtration floor surface concentrates into a communication hole and flows into a discharge path at a high dynamic pressure (a high speed). In particular, particles having high hardness in the suspended matter wear the communication hole and the discharge path, which will require parts replacement.

Japanese Utility Model Registration Application Publication No. 58-116005 discloses a filter-press filter-cloth damage detection device in which a filtration discharge pipe communicating with each filtration chamber is branched at its lower portion into two branch pipes, and a three-way valve is provided at the branch. In FIG. 1 of the publication, a turbidity meter is provided to one of the branch pipes, and the other of the branch pipes is connected to a common collection pipe. In FIG. 3 of the publication, one of the branch pipes is connected to a common collection pipe, and the other of the branch pipes is connected to a common branch pipe to perform measurement with a turbidity meter.

Japanese Patent No. 5582359 discloses a filter-press filter-cloth damage detection device in which a remote detection device including a transmissive optical sensor is provided on a side of a row of filter plates, and when a filter cloth is damaged, a detection rod protrudes in the direction of the side of the filter plate and blocks a projected light beam of the optical sensor, activating an alarm device.

SUMMARY OF THE INVENTION

The technique illustrated in FIG. 1 of Japanese Utility Model Registration Application Publication No. 58-116005 requires a turbidity meter for each filtration chamber, and thus it is expensive and has a high risk of failure and malfunction. The technique illustrated in FIG. 3 of Japanese Utility Model Registration Application Publication No. 58-116005 requires only one turbidity meter, but it requires switching of the filtrate discharged from each filtration chamber by using the three-way valves and requires individual checking each time. Hence, it takes time and efforts to determine which filter cloth is damaged.

The technique disclosed in Japanese Patent No. 5582359 requires a detection rod configured to protrude from each filter plate when the filter cloth is damaged, and thus it is expensive and has a high risk of failure and malfunction. In addition, to determine which filter cloth is damaged, the filter plate whose detection rod protruded needs to be visually checked.

The disclosure is directed to a filter-press filter-cloth damage detection device capable of detecting damage of a filter cloth with high accuracy during operation of a filter press and determining which one of the filtration chambers located side by side the damaged filter cloth belongs to by using one measuring instrument.

A filter-press filter-cloth damage detection device for a filter press in accordance with some embodiments includes a detection path and a detection device. In the filter press, a filtrate produced by solid-liquid separation operation of a filter cloth nipped between filter plates is discharged into a collection pipe via a filtrate passage of each of the filter plates. The detection path extends in a straight line. A filtrate discharged from each of filtration chambers formed between adjacent filter plates is collected to the detection path. The detection device is configured to transmit, from an end portion of the detection path, an irradiation wave or a pulse that reflects on an interface between a clear filtrate and a filtrate with a prescribed turbidity, convert a propagation time from the transmission until reception of a reflected wave into a distance, and output the distance.

With the above configuration, it is possible to detect damage of a filter cloth with high accuracy and easily determine which filter cloth is damaged.

Each of the filter plates may have a discharge port, and the detection path may be a collection pipe defined by the discharge ports connected to one another in an arrangement direction of the filter plates with the filter plates being closed, and the detection device may be configured to transmit the irradiation wave and provided at an upstream end of the detection path which is on an upstream side of the filtrate flowing down the detection path. Or the detection path may be a collection pipe provided beside the filter plates separately from the filter plates, and the detection device may be configured to transmit the irradiation wave and provided at an upstream end of the detection path which is on an upstream side of the filtrate flowing down the detection path.

With the above configuration, an existing apparatus can be easily modified, and it is possible to detect the distance accurately even if a polluted water flows downstream.

The detection path may communicate with a portion of the filtrate passage of each of the filter plates with the filter plates being closed.

With the above configuration, it is possible to accurately detect the position at which the concentration of filtrate is high by using the irradiation wave transmitted to a direction orthogonal to the flow-down direction of filtrate.

The detection device may be configured to transmit the irradiation wave such that the irradiation wave passes at a position closer to a connection portion between the detection path and each filtrate passage than a center of the detection path. Or the filter-press filter-cloth damage detection device may further include a flow-down prevention plate located on an upstream side of a connection portion between the detection path and each filtrate passage in the detection path, the flow-down prevention plate allowing the irradiation wave to pass therethrough. Or the filter-press filter-cloth damage detection device may further include a flow-down guide pipe at a connection portion between the detection path and each filtrate passage in the detection path, wherein the flow-down guide pipe may be a T-shaped pipe having first and second openings facing an upstream direction and a downstream direction of the collection pipe, respectively, and the detection device may be configured to transmit the irradiation wave such that the irradiation wave passes through the first and second openings.

With the above configuration, it is possible to detect a filtrate with a high concentration in the collection pipe.

The detection device may include: a main body located at the end portion of the detection path; and a probe extending in the detection path from the main body, and the main body may be configured to transmit the pulse into the probe.

With the above configuration, it is possible to detect damage of a filter cloth with high accuracy and easily determine which filter cloth is damaged.

Each of the filter plates may have a discharge port, and the detection path may be a collection pipe defined by the discharge ports connected to one another in an arrangement direction of the filter plates with the filter plates being closed, and the main body may be provided at an upstream end of the detection path which is on an upstream side of the filtrate flowing down the detection path. Or the detection path may be a collection pipe provided beside the filter plates separately from the filter plates, and the main body may be provided at an upstream end of the detection path which is on an upstream side of the filtrate flowing down the detection path.

With the above configuration, an existing apparatus can be modified easily.

The detection path may communicate with a portion of the filtrate passage of each of the filter plates with the filter plates being closed.

With the above configuration, it is possible to accurately detect the position at which the concentration of filtrate is high by using the pulse transmitted to a direction orthogonal to the flow-down direction of filtrate.

The probe may extend to pass at a position closer to a connection portion between the detection path and each filtrate passage than a center of the detection path. Or the filter-press filter-cloth damage detection device may further include a flow-down guide pipe at a connection portion between the detection path and each filtrate passage in the detection path, wherein the flow-down guide pipe may be a T-shaped pipe having first and second openings facing an upstream direction and a downstream direction of the collection pipe, respectively, and the probe may be arranged to pass through the first and second openings.

With the above configuration, it is possible to detect a filtrate with a high concentration in the collection pipe.

With the above configuration, for example, it is possible to determine which one of the filtration chambers located side by side the damaged filter cloth belongs to by using one measuring instrument. Stopping the filter press for inspection and opening the filter plates for visual checking are not necessary. A cumbersome operation such as switching the filtrate is also not necessary, and thus it is easy to perform detection.

DETAILED DESCRIPTION OF THE INVENTION

Figure 1:
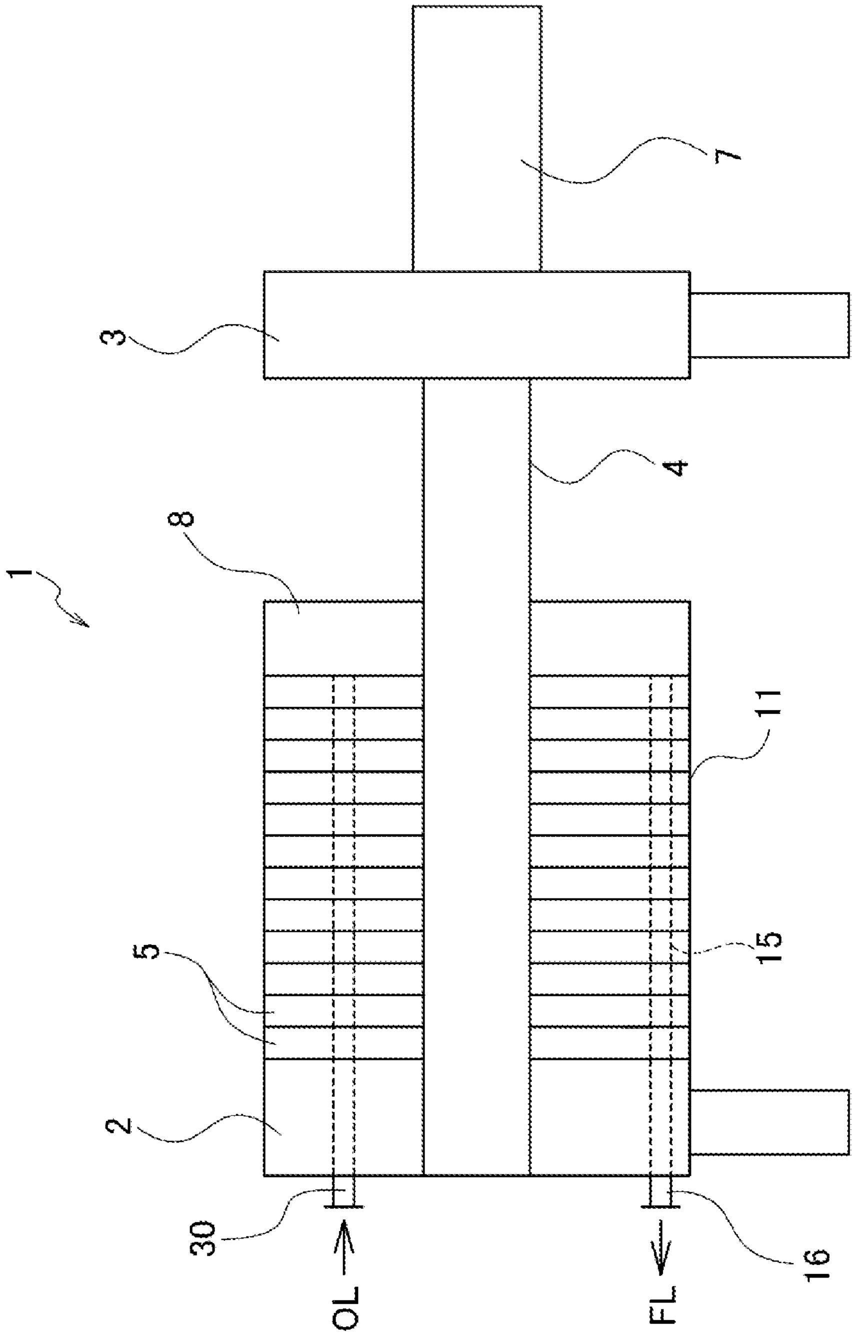
FIG. 1 is a schematic side view of a filter press according to first to fourth embodiments of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from that in reality.

Figure 2:
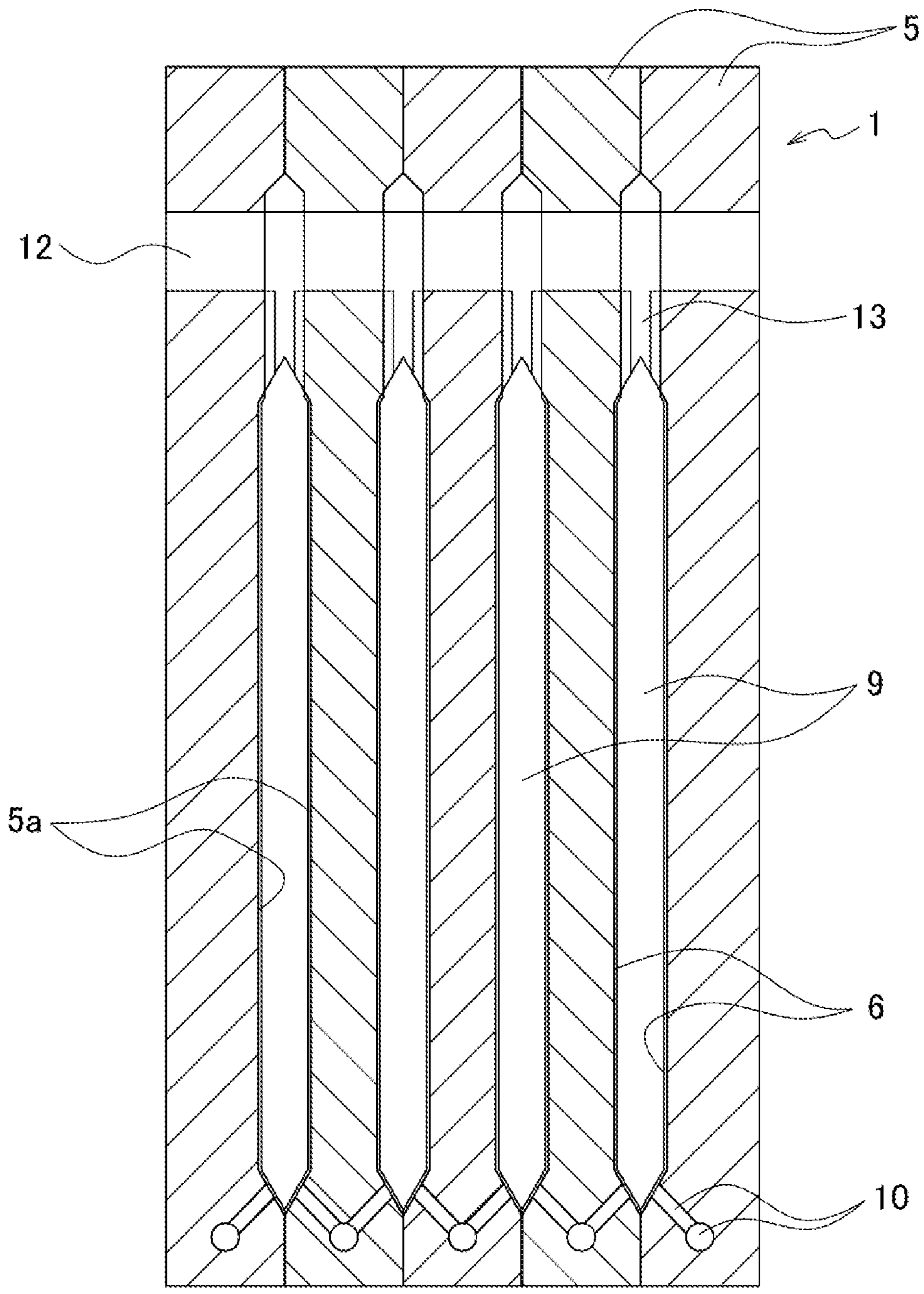
FIG. 2 is a schematic cross-sectional view of filtration chambers of the filter press according to the first to fourth embodiments.
Figure 3:
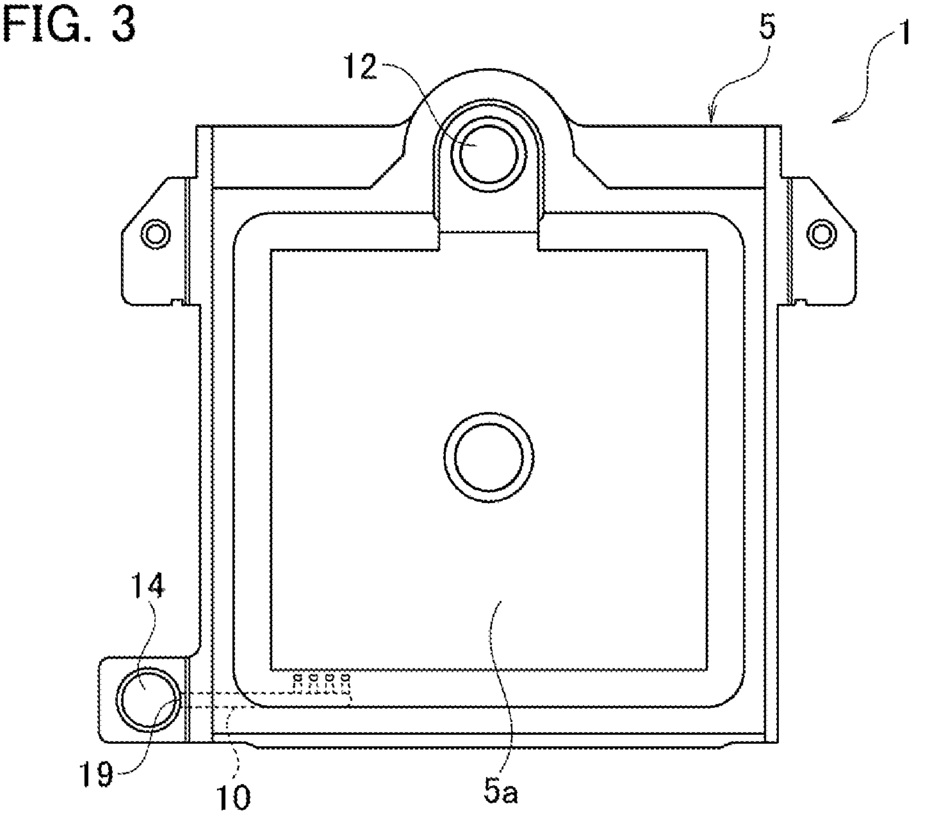
FIG. 3 is a front view of a filter plate of the filter press according to the first to fourth embodiments.
Figure 4:
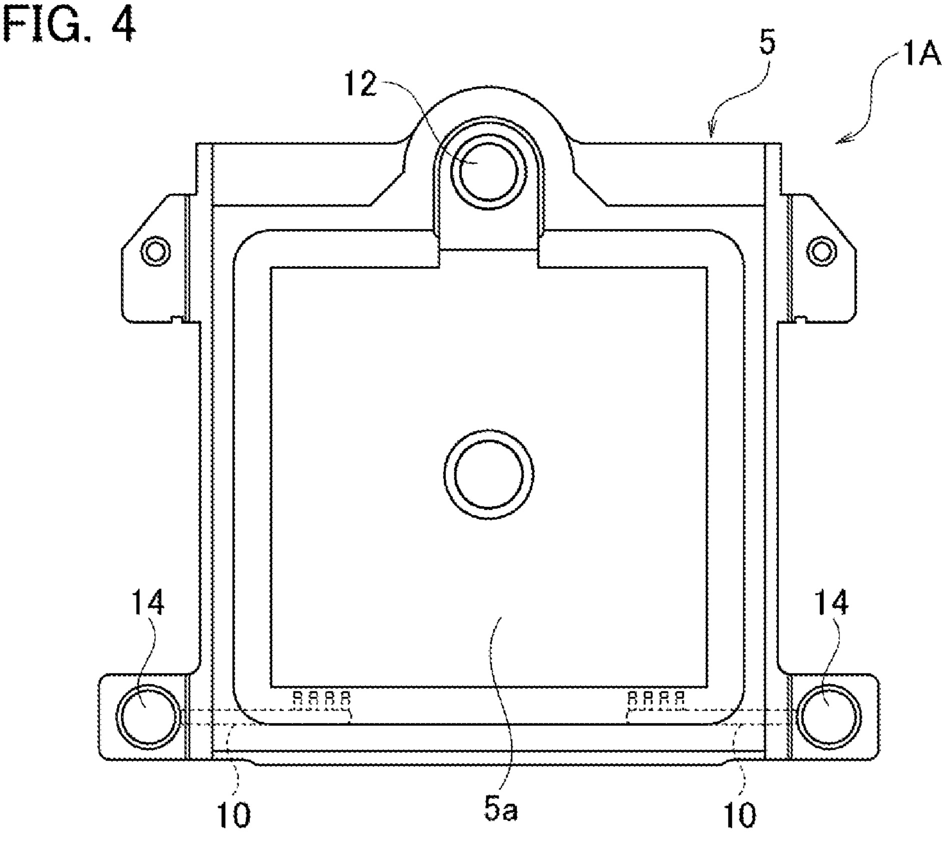
FIG. 4 is a front view of a filter plate of a filter press according to a modification example of the first to fourth embodiments.
Figure 5:
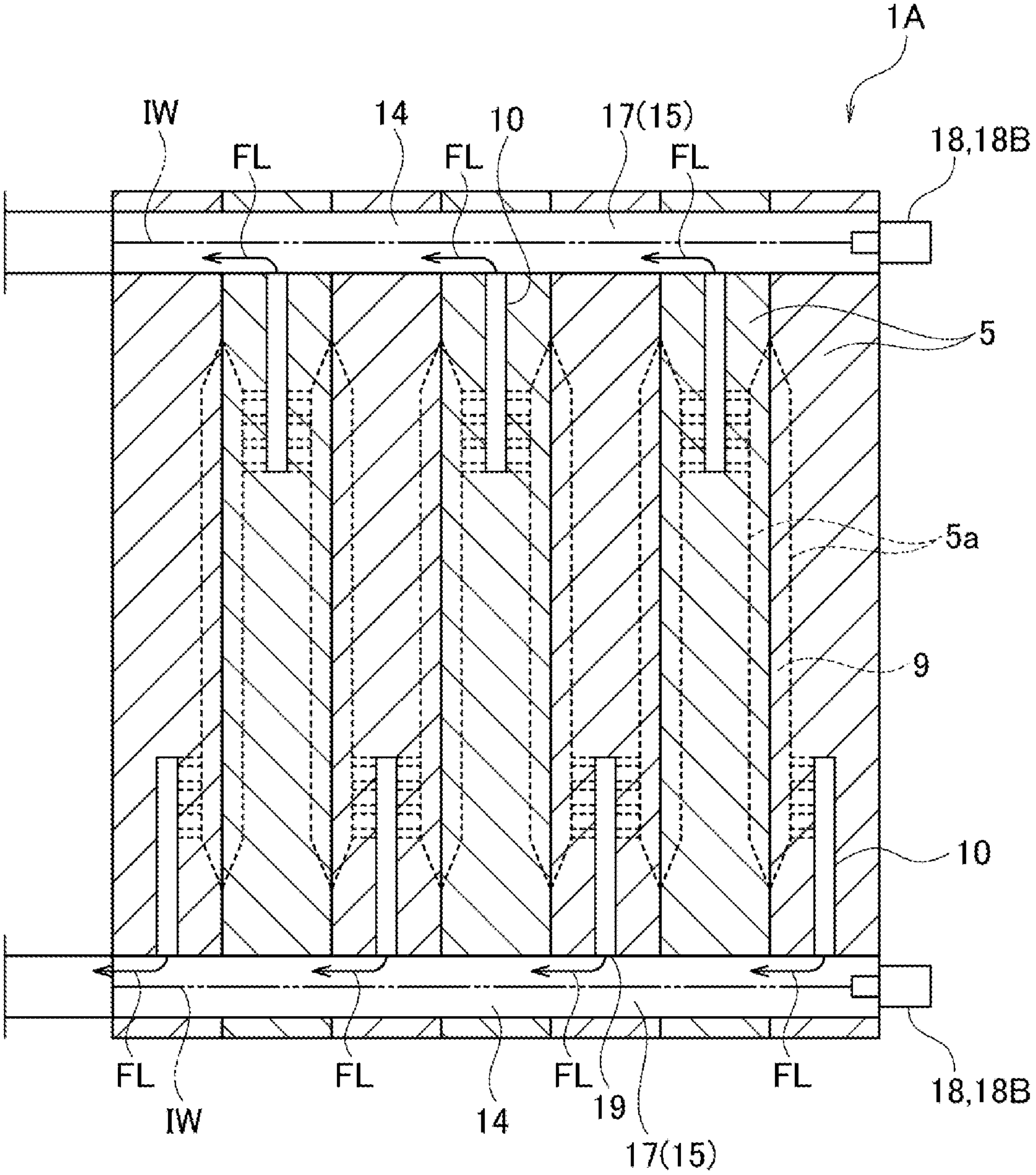
FIG. 5 is a cross-sectional view of the filter press according to the modification example of the first to fourth embodiments taken along a horizontal plane and viewed from above.
Figure 6:
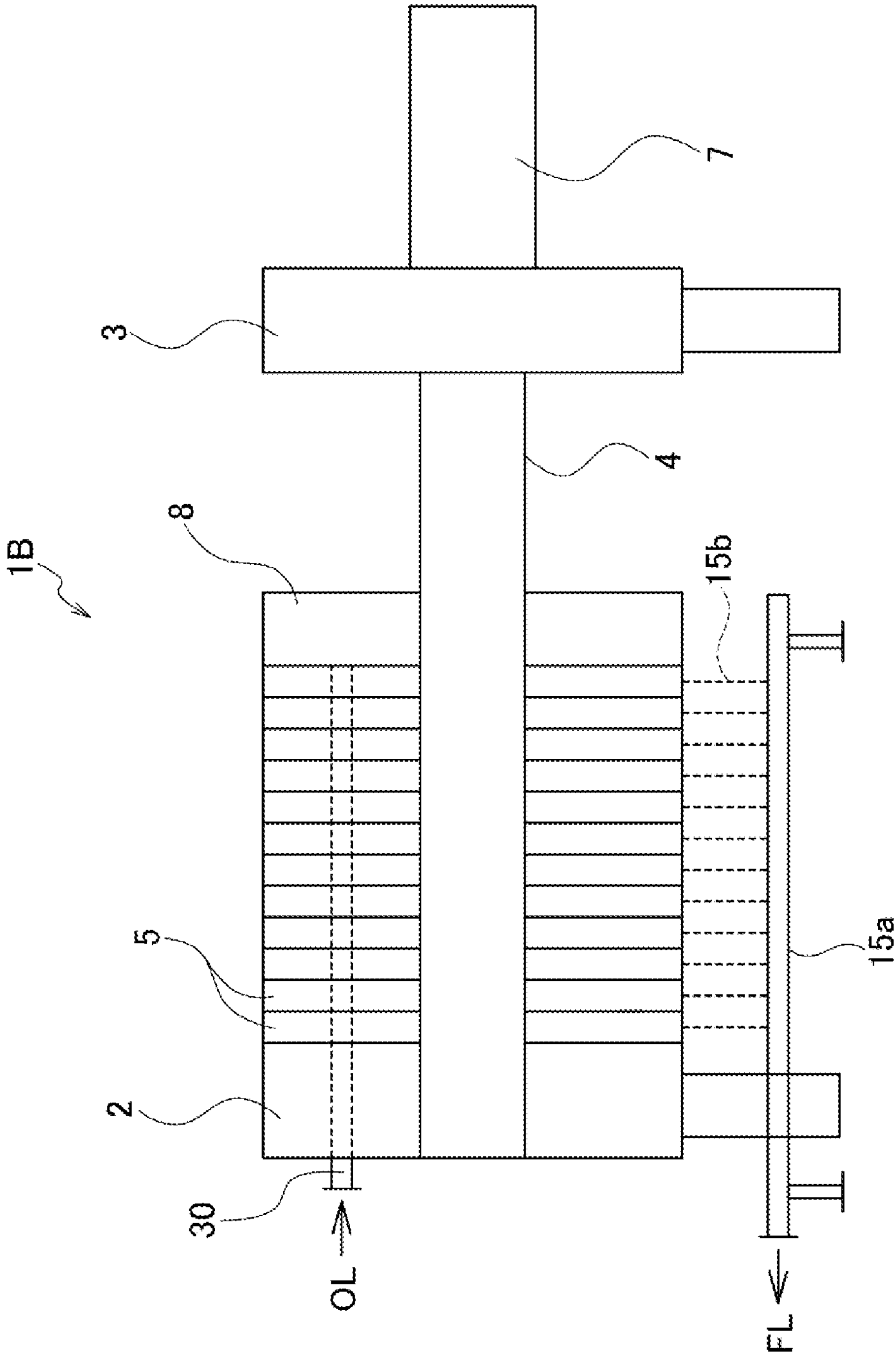
FIG. 6 is a schematic side view of a filter press according to a second modification example of the first to fourth embodiments.
Figure 7:
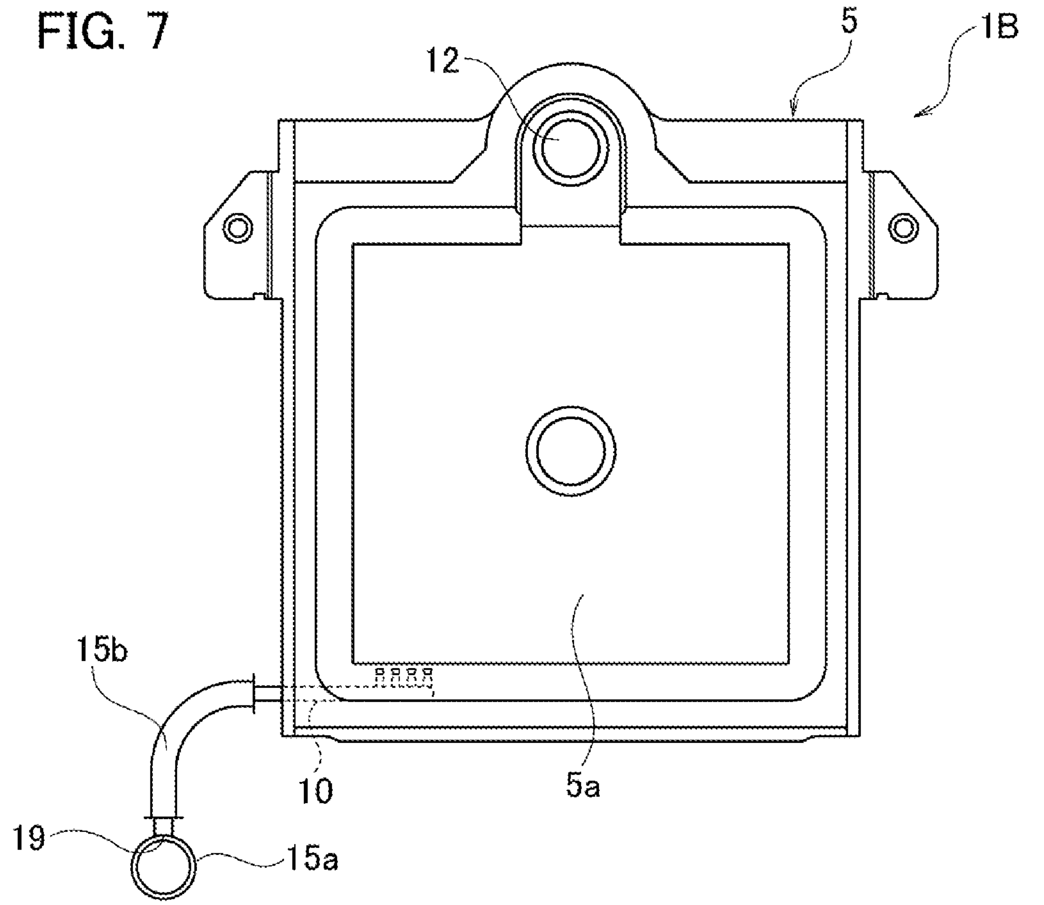
FIG. 7 is a front view of a filter plate of the filter press according to the second modification example of the first to fourth embodiments.

First, a configuration common to filter-press filter-cloth damage detection devices 50, 50A, 50B, and 50C according to first to fourth embodiments of the present invention will be described with reference to FIGS. 1 to 5. FIG. 1 is a schematic side view of a filter press 1 including a filter-press filter-cloth damage detection device 50, 50A, 50B, or 50C. FIG. 2 is a schematic cross-sectional view of filtration chambers 9. FIG. 3 is a front view of a filter plate 5. FIGS. 4 and 5 illustrate a modification example of the first to fourth embodiments, FIGS. 6 and 7 illustrate a second modification example of the first to fourth embodiments, and details of these will be described later. The filter press 1 includes a front frame 2, a rear frame 3, a pair of parallel guide rails 4, a plurality of filter plates 5, a plurality of filter cloths 6, an opening-closing device 7, a movable head 8, a connection link 11, a discharge pipe 16, and an untreated-liquid supply pipe 30.

The guide rails 4 are supported by the front frame 2 and the rear frame 3 at both end portions. The plurality of filter plates 5 and the plurality of filter cloths 6 are attached to the guide rails 4. The plurality of filter plates 5 are movable in the front-rear direction on the guide rails 4. As illustrated in FIG. 1, the untreated-liquid supply pipe 30 is connected to the front frame 2 and configured to supply untreated liquid OL to the filter plates. The discharge pipe 16 is connected to the front frame 2 and configured to discharge filtrate FL (hereinafter, the reference sign is omitted) produced by solid liquid separation in the filtration chambers 9 to the outside of the filter press 1. As illustrated in FIGS. 2 and 3, each filter plate 5 includes an untreated-liquid supply path 12, a filtration floor surface(s) 5*a*, an untreated-liquid passage 13, a discharge port 14, and a filtrate passage 10. The untreated-liquid supply path 12 is formed at an upper portion of each filter plate 5. The filtration floor surface 5*a* is formed on the front surface and the back surface of each filter plate 5 and has a recessed shape. A filtration floor surface 5*a* faces a filtration floor surface 5*a* of an adjacent filter plate 5 when the filter plates 5 are closed, and the facing filtration floor surfaces 5*a* form a filtration chamber 9 in between. The untreated-liquid passage 13 connects the untreated-liquid supply path 12 to the filtration chamber 9 and supplies untreated liquid OL to the filtration chamber 9. The discharge port 14 is formed at an outer portion of each filter plate 5 on one side. The filtrate passage 10 connects the filtration floor surface 5*a* to the discharge port 14 and discharges filtrate to the discharge port 14. The filter cloth 6 is provided on the filtration floor surface 5*a* in a tensioned state.

The opening-closing device 7 is supported by the rear frame 3 and configured to open and close the filter plates 5, and includes a hydraulic cylinder, an electric cylinder, or the like. The opening-closing device 7 extends and presses the movable head 8 toward the front frame 2 to close the filter plates 5 as illustrated in FIGS. 1 and 2. When untreated liquid OL is supplied to the filtration chambers 9 between the closed filter plates 5 via the untreated-liquid supply pipe 30, the untreated-liquid supply path 12, and the untreated-liquid passages 13, the untreated liquid OL is separated into solid matter and filtrate by solid-liquid separation operation of the filter cloths 6. The solid matter caught by the filter cloths 6 is dehydrated, forming a cake layer in the filtration chambers 9. The filtrate passing through the filter cloths 6 is discharged to the discharge ports 14 via the filtrate passages 10 of the filtration floor surfaces 5*a* and discharged to the outside via the discharge pipe 16. Note that the filtration floor surface 5*a* on one side is composed of a diaphragm, and the filtration chamber 9 is squeezed by the diaphragm at the solid liquid separation to reduce the water content of solid matter.

After dehydration, the opening-closing device 7 is contracted to open the filter plates 5. The filter plates 5 are opened at the same time and located at prescribed intervals determined by the connection link 11. Then, cakes in the filtration chambers 9 are dropped and discharged to the outside of the apparatus. The filter plates 5 may be opened sequentially one by one.

As illustrated in FIGS. 1 and 2, when the filter plates 5 are closed, the untreated-liquid supply paths 12 of the filter plates 5 are connected to one another in the arrangement direction of the filter plates 5 and form a flow path for the untreated liquid OL supplied from the untreated-liquid supply pipe 30. When the filter plates 5 are closed, untreated-liquid passages 13 of adjacent filter plates 5 form a passage for the untreated liquid OL flowing through the untreated-liquid supply path 12 to the filtration chamber 9.

As illustrated in FIG. 3, one end of the filtrate passage 10 is opened at a lower portion of the filtration floor surface 5*a* where filtrate gathers. The filtrate passage 10 passes through a wall of the filter plate 5, and the other end of the filtrate passage 10 is connected the discharge port 14 formed at an outer portion of the filter plate 5. The discharge port 14 communicating with the filtrate passage 10 is provided to extend through the filter plate 5 in the thickness direction. When the filter plates 5 are closed, the discharge ports 14 of the filter plates 5 are connected to one another in the arrangement direction of the filter plates 5 and form a collection pipe 15. The filtrate passage 10 and the discharge port 14 (the collection pipe 15) is connected at a connection portion 19. The filtrate produced by solid-liquid separation operation of each filtration chamber 9 passes through each filtrate passage 10 and the collection pipe 15 and is discharged to the outside from the discharge pipe 16. As described above, a large amount of filtrate produced by solid-liquid separation operation of the filter cloths 6 is pressurized by the diaphragms and the like, flows out through the filtrate passages 10 into the discharge ports 14, and flows down in the collection pipe 15 toward the front frame 2.

Although the connection portion 19 in the present embodiment is located approximately at the center of the discharge port 14 in the up-down direction, the present invention is not limited to this configuration. For example, the connection portion 19 may be located at a position lower than or higher than the center of the discharge port 14 (for example, at the top of the discharge port 14).

Although the discharge port 14 in the present embodiment is formed at an outer portion of each filter plate 5 on one side, the present invention is not limited to this configuration. For example, a configuration illustrated in FIGS. 4 and 5 is possible. FIG. 4 is a front view of a filter plate 5 of a filter press 1A according to a modification example of the first to fourth embodiments. FIG. 5 is a cross-sectional view of the filter press 1A according to the modification example of the first to fourth embodiments taken along a horizontal plane and viewed from above. As illustrated in FIGS. 4 and 5, the discharge port 14 is formed on both outer sides of each filter plate 5, forming two collection pipes 15. A filtrate passage 10 is provided symmetrically between two adjacent filter plates 5, and filtrate is discharged into discharge ports 14 provided on either outer side of the filter plates 5. The two collection pipes 15 form two detection paths 17 described later, and a detection device 18 or a detection device 18B described later (FIG. 5 only illustrates the configuration of the detection devices 18) is provided at one end of each of the two collection pipes 15 (the two detection paths 17) on the upstream side of the filtrate flowing down the collection pipe 15. Note that in the modification example illustrated in FIGS. 4 and 5, each filter plate 5 may have filtrate passages 10 connected to the two discharge ports 14 located on either outer side.

Although the collection pipe 15 (the discharge port 14) in the present embodiment is integrated with the filter plates 5, the present invention is not limited to this configuration. For example, a configuration illustrated in FIGS. 6 and 7 is possible. FIG. 6 is a schematic side view of a filter press 1B according to a second modification example of the first to fourth embodiments. FIG. 7 is a front view of a filter plate 5 of the filter press 1B according to the second modification example of the first to fourth embodiments. As illustrated in FIGS. 6 and 7, a collection pipe 15*a* independent of the row of filter plates 5 is provided beside the row of filter plates 5, and the filtrate passage 10 of each filter plate 5 is connected to the collection pipe 15*a* with a flexible tube 15*b* or the like, so that filtrate is discharged from each filtration chamber 9 to the collection pipe 15*a* via the tube 15*b* or the like.

As described above, in the state in which the filter plates 5 are closed, when untreated liquid OL is supplied through the untreated-liquid supply path 12 and the untreated-liquid passage 13 into between the filter cloths 6 in each filtration chamber 9, untreated liquid OL is subjected to solid liquid separation operation of the filter cloths 6, and the filtrate having passed through the filter cloth 6 flows into the filtrate passage 10 provided at a lower portion of the filtration floor surface 5*a*. In this operation, if a filter cloth 6 is damaged, solid matter passes through a damaged portion of the filter cloth 6 with filtrate and flows into the filtrate passage 10.

Figure 8:
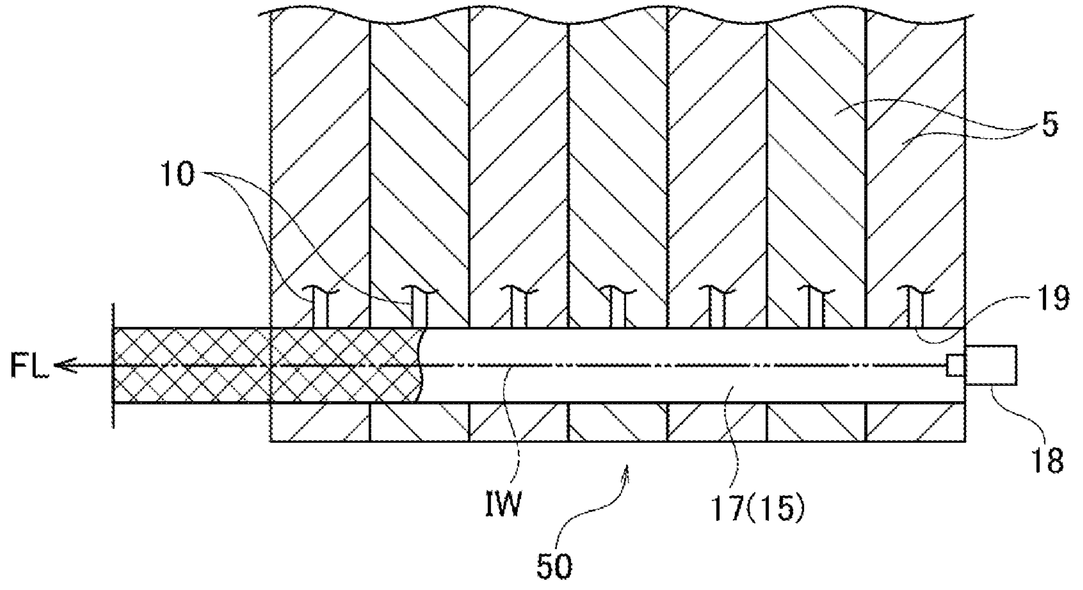
FIG. 8 is a diagram for schematically explaining detection in a detection path of the filter press according to the first embodiment.

Next, the filter-press filter-cloth damage detection device 50 according to the first embodiment will be described. FIG. 8 is a diagram for schematically explaining the filter-press filter-cloth damage detection device 50 that performs detection in a detection path 17. The filtrate discharged from each filtration chamber 9 is collected to the common detection path 17, and the position at which suspension flowed into the detection path 17 is measured by the detection device 18. In the present embodiment, the detection path 17 in which filtrate is detected by the detection device 18 is the collection pipe 15. The detection device 18 is fixed to the movable head 8 and is located at one end (the rear portion) of the collection pipe 15 on the upstream side of the filtrate flowing down the collection pipe 15. The detection device 18 is capable of performing detection linearly and longitudinally inside the collection pipe 15 toward the other end (the front portion) of the collection pipe 15, which is on the front frame 2 side. The detection device 18 detects the distance from the detection device 18 to the interface between a clear filtrate and a filtrate with a prescribed turbidity that are discharged from the filtration chambers 9 to the collection pipe 15.

The detection device 18 transmits irradiation waves IW into the collection pipe 15, measures the propagation time from the transmission until the detection device 18 receives reflection waves which are irradiation waves IW reflected on a filtrate with the prescribed turbidity, converts the propagation time into a distance, and outputs the distance. The present embodiment employs a laser level meter for the detection device 18, and the detection device 18 located at the rear portion of the collection pipe 15 emits laser light toward the front portion in the collection pipe 15.

In the case of no damage in the filter cloths 6, since the collection pipe 15 is filled with a clear filtrate, the laser light reaches the other end of the collection pipe 15, and the detection device 18 receives light reflected on the discharge pipe 16. In this case, the detection device 18 outputs a distance longer than or equal to the length of the row of filter plates 5.

In contrast, when damage occurs in one of the filter cloths 6, and a filtrate with a high turbidity containing suspended matter from the filtration chamber 9 is discharged into the collection pipe 15, the laser light is reflected on the filtrate with a high turbidity discharged from the connection portion 19 of the corresponding filtrate passage 10 into the collection pipe 15. In this case, the detection device 18 receives the reflection light and outputs the distance to the position at which the filtrate with a high turbidity was discharged. Thus, it becomes instantly clear that there is a high possibility that the filter cloth 6 of the filtration chamber 9 corresponding to the outputted distance is damaged. Thus, it is possible to detect whether a filter cloth 6 is damaged or not with high accuracy and easily determine which filter cloth 6 is damaged. In addition, an existing apparatus can be easily modified, and even if a polluted water flows downstream, it is possible to detect the distance accurately.

In order to detect damage of a filter cloth 6 with high accuracy, the output of the irradiation waves IW transmitted by the detection device 18 may be adjusted in advance in accordance with the type of untreated liquid OL to be subjected to solid liquid separation in the filter press 1 or 1A.

At an irregularity when the detection device 18 outputs a distance shorter than the length of the row of the filter plates 5, an operation panel or the like may issue an alarm. In a possible configuration, the distance from the detection device 18 to each connection portion 19 may be inputted and stored, and the filtration chamber 9 or the filter cloth 6 corresponding to the outputted distance may be outputted to an operation panel or the like, so that the position at which a filtrate with a high turbidity was discharged can be detected in the filtrate discharged from each filtrate passage 10 to the collection pipe 15.

Although the present embodiment employs laser light for the irradiation waves IW, the present invention is not limited to this configuration. Any type of irradiation wave that passes through transparent substances and reflects on the interface between a clear filtrate and a filtrate with a prescribed turbidity (for example, ultrasonic waves, microwaves, and the like) can be used for the irradiation waves IW transmitted by the detection device 18.

Figure 9A:
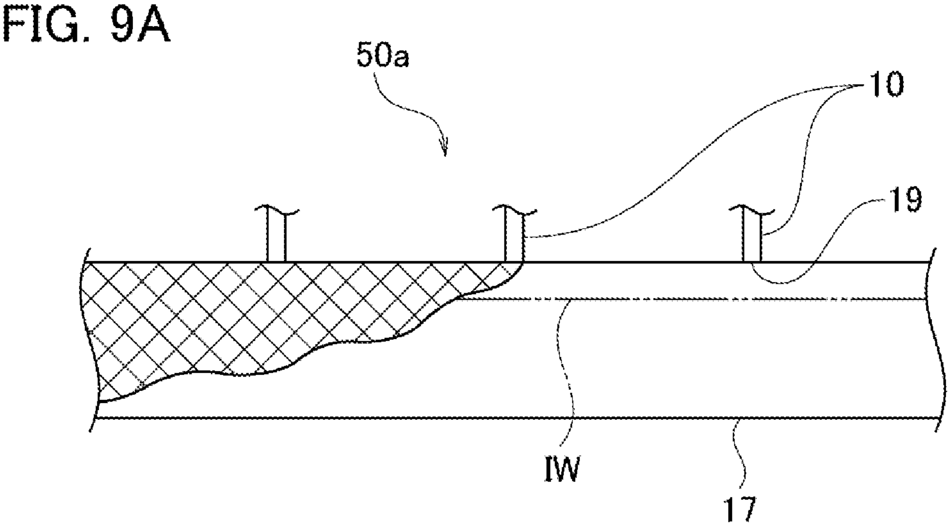
FIG. 9A is a diagram for schematically explaining detection in a detection path according to modification example 1 of the first embodiment.

The filter-press filter-cloth damage detection device 50*a* according to modification example 1 of the first embodiment will be described. Description of the components the same as or similar to those of the first embodiment is omitted. FIG. 9A is a diagram for schematically explaining the filter-press filter-cloth damage detection device 50*a* configured to perform detection in the detection path 17. In modification example 1 of the first embodiment, the detection path 17 in which filtrate is detected by the detection device 18 is also the collection pipe 15, as in the first embodiment. The filtrate discharged from the filtrate passages 10 into the collection pipe 15 flows down in the collection pipe 15 toward the front frame 2. Hence, the filtrate discharged from downstream filtration chambers 9 into the collection pipe 15 is swept away by the filtrate flowing down in the collection pipe 15 from the upstream side. Thus, the filtrate discharged from a downstream filtration chamber 9 flows downstream immediately after it is discharged from the connection portion 19 into the collection pipe 15, and the irradiation waves IW passing through the center of the collection pipe 15 sometimes cannot detect it, or a detected position sometimes can have an error. In consideration of such cases, in modification example 1 of the first embodiment, the irradiation waves IW passing through a position closer to the connection portions 19 than the center of the collection pipe 15 is emitted as illustrated in FIG. 9A.

Figure 9B:
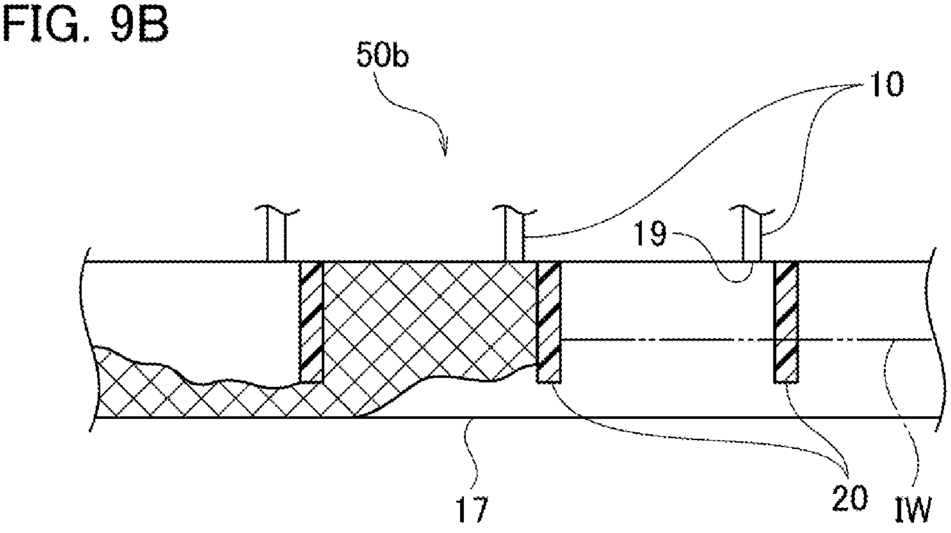
FIG. 9B is a diagram for schematically explaining detection in a detection path according to modification example 2 of the first embodiment.

The filter-press filter-cloth damage detection device 50*b* according to modification example 2 of the first embodiment will be described. Description of the components the same as or similar to those of the first embodiment is omitted. FIG. 9B illustrates modification example 2 of the first embodiment including a flow-down prevention plate 20 on the upstream side of each connection portion 19. In modification example 2 of the first embodiment, the detection path 17 in which filtrate is detected by the detection device 18 is also the collection pipe 15, as in the first embodiment. In modification example 2 of the first embodiment, a transparent flow-down prevention plate 20 through which the irradiation waves IW pass is provided on the upstream side of each connection portion 19, so that the flow-down prevention plate 20 blocks the pressure of the filtrate flowing down from the upstream side, and the filtrate discharged from each filtrate passage 10 into the collection pipe 15 flows, at that position, to near the inner peripheral surface of the collection pipe 15 opposed to the connection portion 19. The irradiation waves IW of the detection device 18 according to modification example 2 of the first embodiment pass through a clear filtrate and transparent flow-down prevention plates 20 and reflects on the interface between the clear filtrate and a filtrate with a prescribed turbidity. Hence, it is possible to detect a filtrate with a high concentration in the collection pipe 15, thereby making the detection more accurate. The flow-down prevention plate 20 extends downward from above to an appropriate position depending on the emission position of the irradiation waves IW of the detection device 18. The position of the lower end of the flow-down prevention plate 20 can be determined in advance by conducting an experiment or the like. Note that in the case in which the connection portion 19 is located at the top of the discharge port 14 (the collection pipe 15) in modification example 2 of the first embodiment, the filtrate discharged from each filtrate passage 10 to the collection pipe 15 flows, at that position, to near the bottom portion due to the flow-down prevention plate 20.

Figure 9C:
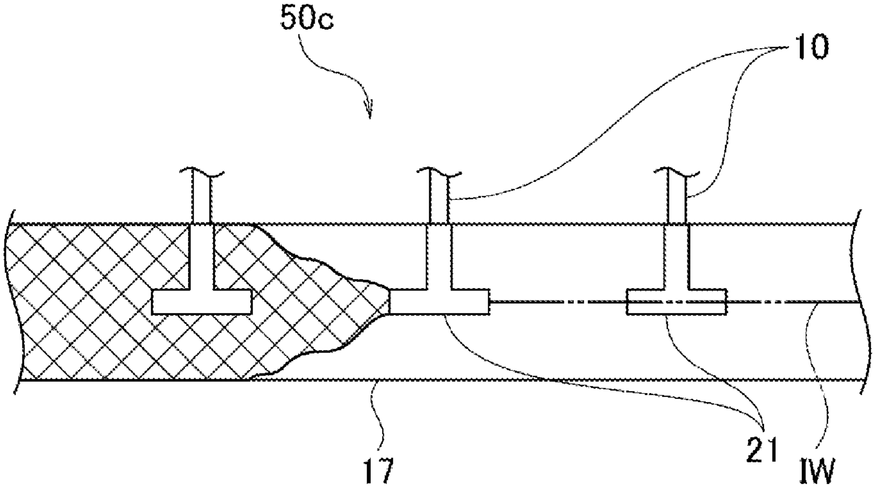
FIG. 9C is a diagram for schematically explaining detection in a detection path according to modification example 3 of the first embodiment.

The filter-press filter-cloth damage detection device 50*c* according to modification example 3 of the first embodiment will be described. Description of the components the same as or similar to those of the first embodiment is omitted. FIG. 9C illustrates modification example 3 of the first embodiment including a flow-down guide pipe 21 at each connection portion 19 in the collection pipe 15. In modification example 3 of the first embodiment, the detection path 17 in which filtrate is detected by the detection device 18 is also the collection pipe 15, as in the first embodiment. The flow-down guide pipe 21 is a T-shaped pipe having a smaller diameter than the collection pipe 15. In modification example 3 of the first embodiment, the flow-down guide pipe 21 is connected to each connection portion 19 in the collection pipe 15, and the irradiation waves IW of the detection device 18 pass inside the flow-down guide pipes 21. This configuration enables filtrate to be detected before the concentration of the filtrate becomes low, and thus, it is possible to detect a filtrate with a high concentration in the collection pipe 15, thereby making the detection more accurate. Since the opening directions of the openings of the flow-down guide pipe 21 are aligned with the upstream and downstream directions of the collection pipe 15, one beam of irradiation waves IW can detect the filtrate in all the flow-down guide pipes 21 arranged in a row. The diameter of the T-shaped pipe serving as the flow-down guide pipe 21 can be determined in advance by conducting an experiment or the like, for example, such that the flow-down guide pipe 21 does not excessively impede the flow of the filtrate, and detection can be performed before the concentration of the filtrate becomes low.

Figure 10:
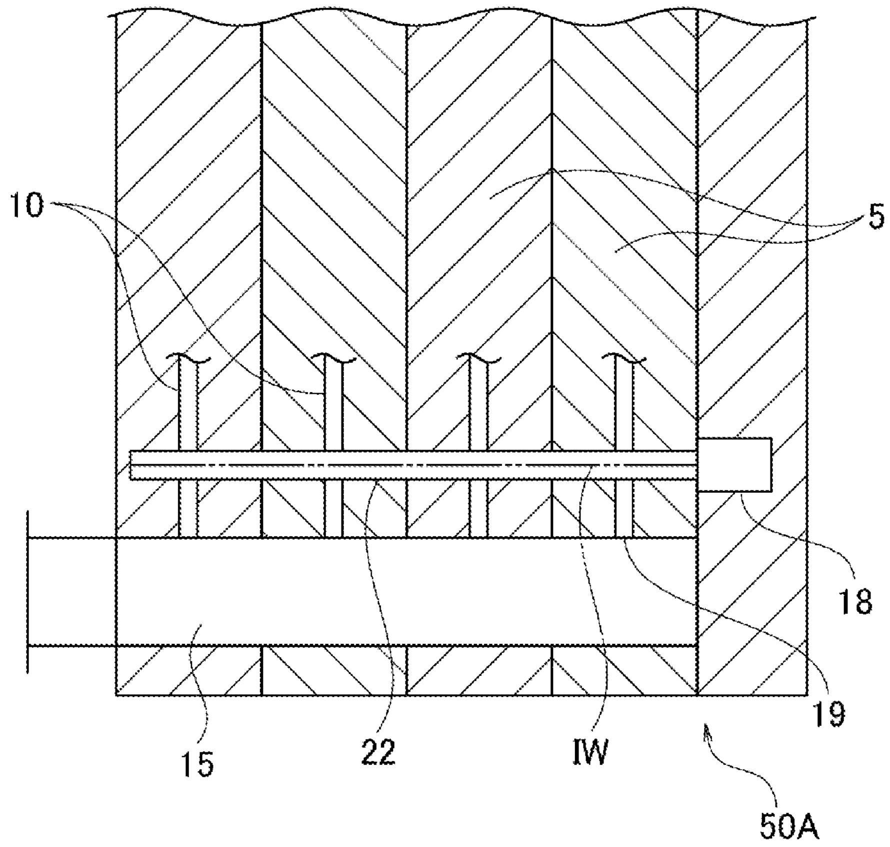
FIG. 10 is a diagram for schematically explaining detection in a detection path according to the second embodiment.

The filter-press filter-cloth damage detection device 50A according to the second embodiment will be described. FIG. 10 is a diagram for schematically explaining the filter-press filter-cloth damage detection device 50A configured to perform detection in a detection path 22. Description of the components the same as or similar to those of the first embodiment is omitted. In the second embodiment, unlike the detection path 17 of the first embodiment, the detection path 22 is formed to extend in the front-rear direction and communicate with a portion of each filtrate passage 10 preceding the collection pipe 15. As with the collection pipe 15, the entire detection path 22 is formed when the filter plates 5 are closed. The detection device 18 is fixed to the movable head 8 and located at one end of the detection path 22. The detection device 18 emits irradiation waves IW from the one end of the detection path 22 toward the other end of the detection path 22. The detection path 22 is formed in a straight line as with the collection pipe 15 and has a smaller diameter than the collection pipe 15, and the end of the detection path 22 is closed to be a dead end. At and near the connection point between each filtrate passage 10 and the detection path 22, filtrate flows in a direction orthogonal to the detection path 22. Thus, it is less likely that the filtrate in the detection path 22 flows in the directions of the adjacent filtration chambers 9, and even if there is a flow of filtrate in the detection path 22, the turbidity of filtrate near the filtrate passage 10 can be high. This configuration in the second embodiment enables a filtrate with a high turbidity to be detected at and near the connection point between each filtrate passage 10 and the detection path 22. Thus, it is possible to accurately detect the position at which the concentration of filtrate is high by using the irradiation waves IW transmitted in a direction orthogonal to the flow-down direction of filtrate.

Figure 11:
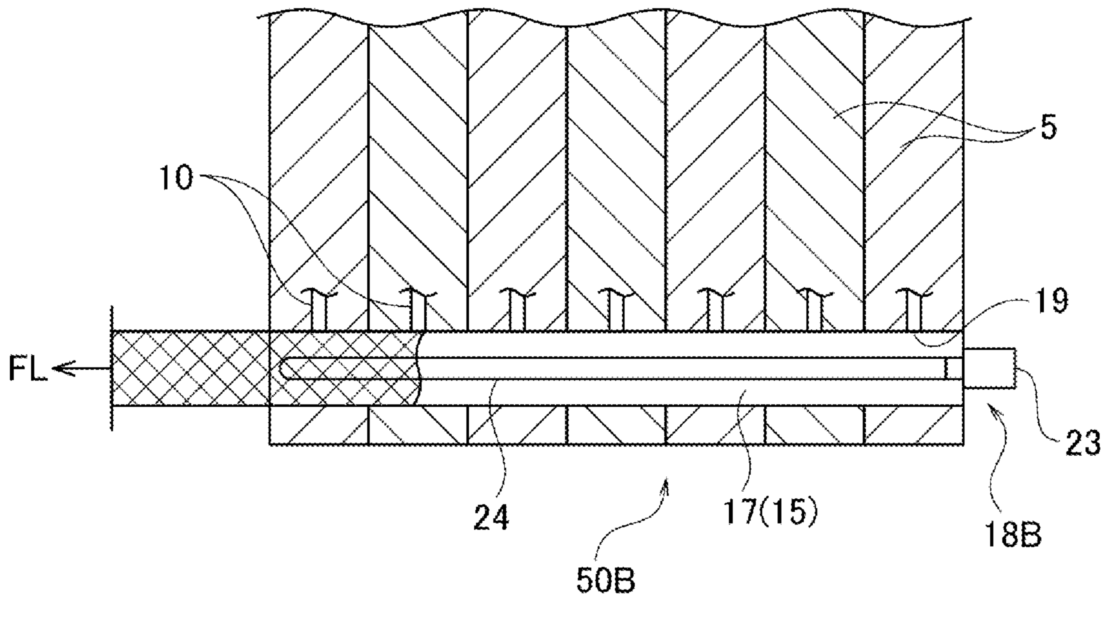
FIG. 11 is a diagram for schematically explaining detection in a detection path of a filter press according to the third embodiment.

The filter-press filter-cloth damage detection device 50B according to the third embodiment will be described. FIG. 11 is a diagram for schematically explaining the filter-press filter-cloth damage detection device 50B configured to perform detection in a detection path 17. Description of the components the same as or similar to those of the first embodiment is omitted as appropriate. The filtrate discharged from each filtration chamber 9 is collected to the common detection path 17, and the position at which suspension flows into the detection path 17 is measured by a detection device 18B. In the third embodiment, the detection path 17 in which filtrate is detected by the detection device 18B is also the collection pipe 15, as in the first embodiment.

The detection device 18B includes a main body 23 and a probe 24 extending from the main body 23. The main body 23 is fixed to the movable head 8 and is located at one end (the rear portion) of the collection pipe 15 on the upstream side of the filtrate flowing down the collection pipe 15. The probe 24 extends in the collection pipe 15 from the main body 23 (the one end of the collection pipe 15) to near the other end (the front portion) of the collection pipe 15 toward the front frame 2. The detection device 18B is capable of performing detection linearly and longitudinally inside the collection pipe 15 toward the other end (the front portion) of the collection pipe 15. The detection device 18B detects the distance from the main body 23 of the detection device 18B to the position of the interface between a clear filtrate and a filtrate with a prescribed turbidity discharged from each filtration chamber 9 to the collection pipe 15. To be more specific, the detection device 18B causes pulses such as microwave or the like to propagate in the probe 24 from the main body 23, measures the propagation time from the transmission until the main body 23 receives the pulses reflected by the difference in permittivity at the interface between different liquids, converts the propagation time into a distance, and outputs the distance. The present embodiment employs a guide pulse level meter for the detection device 18B.

In the case of no damage in the filter cloths 6, the filtrate discharged from the connection portion 19 of each filtrate passage 10 into the collection pipe 15 has the same quality and does not have a difference in permittivity. Thus, the pulses reflect at the distal-end position of the probe 24 of the detection device 18B.

In contrast, when damage occurs in one of the filter cloths 6, and a filtrate with a high turbidity containing suspended matter from the filtration chamber 9 is discharged into the collection pipe 15, a difference in permittivity occurs at the boundary between a clear filtrate and the filtrate with a high turbidity discharged from the connection portion 19 of the filtrate passage 10 into the collection pipe 15, and part of the pulses propagating in the probe 24 reflects by the difference in permittivity. In this case, the main body 23 of the detection device 18B receives the reflected pulses and outputs the distance to the position at which the filtrate with a high turbidity was discharged. Thus, it becomes instantly clear that there is a high possibility that the filter cloth 6 of the filtration chamber 9 corresponding to the outputted distance is damaged. Thus, it is possible to detect whether a filter cloth 6 is damaged or not with high accuracy and easily determine which filter cloth 6 is damaged. In addition, an existing apparatus can be easily modified, and even if a polluted water flows downstream, it is possible to detect the distance accurately.

As in the first embodiment, in order to detect damage of a filter cloth 6 with high accuracy, the detection sensitivity of the detection device 18B may be adjusted in advance in accordance with the type of untreated liquid OL to be subjected to solid liquid separation in the filter press 1 or 1A.

As in the first embodiment, when the detection device 18B detects an irregularity in the filter cloths 6, an operation panel or the like may issue an alarm. In a possible configuration, as in the first embodiment, the distance from the detection device 18B to each connection portion 19 may be inputted and stored, and the filtration chamber 9 or the filter cloth 6 corresponding to the outputted distance may be outputted to an operation panel or the like, so that the position at which a filtrate with a high turbidity is discharged can be detected in the filtrate discharged from each filtrate passage 10 to the collection pipe 15.

Although the present embodiment employs electromagnetic pulses for the pulses, the present invention is not limited to this configuration. Any type of pulse that is reflected by the difference in permittivity at the boundary between a clear filtrate and a filtrate with a prescribed turbidity can be used for the pulses that the main body 23 of the detection device 18 transmits.

Figure 12A:
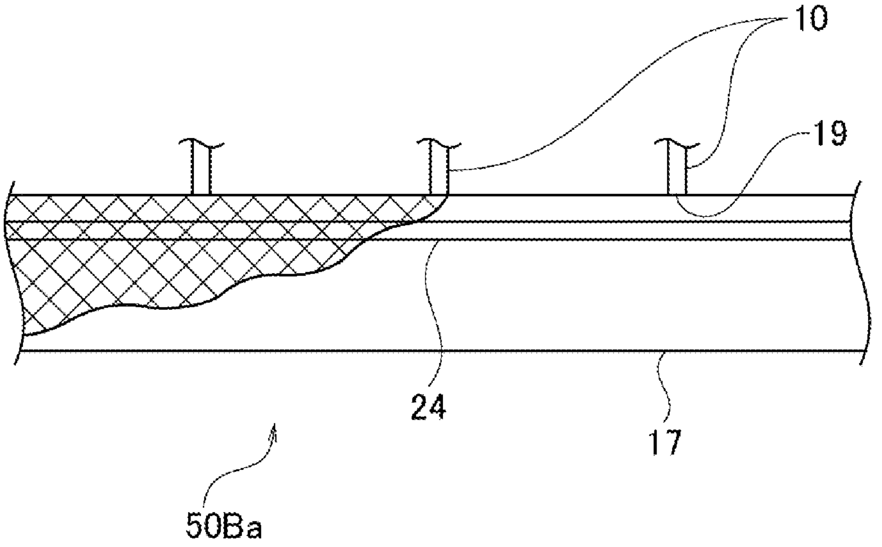
FIG. 12A is a diagram for schematically explaining detection in a detection path according to modification example 1 of the third embodiment.

The filter-press filter-cloth damage detection device 50Ba according to modification example 1 of the third embodiment will be described. Description of the components the same as or similar to those of the third embodiment is omitted. FIG. 12A is a diagram for schematically explaining the filter-press filter-cloth damage detection device 50Ba configured to perform detection in the detection path 17. In modification example 1 of the third embodiment, the detection path 17 in which filtrate is detected by the detection device 18B is also the collection pipe 15, as in the third embodiment. The filtrate discharged from the filtrate passages 10 into the collection pipe 15 flows down in the collection pipe 15 toward the front frame 2. Hence, the filtrate discharged from downstream filtration chambers 9 into the collection pipe 15 is swept away by the filtrate flowing down in the collection pipe 15 from the upstream side. Thus, the filtrate discharged from a downstream filtration chamber 9 flows downstream immediately after it is discharged from the connection portion 19 into the collection pipe 15, which can cause an error in the position at which the filtrate comes into contact with the probe 24 of the detection device 18B. In consideration of such cases, in modification example 1 of the third embodiment, the probe 24 extends so as to pass through a position closer to the connection portions 19 than the center of the collection pipe 15, as illustrated in FIG. 12A.

Figure 12B:
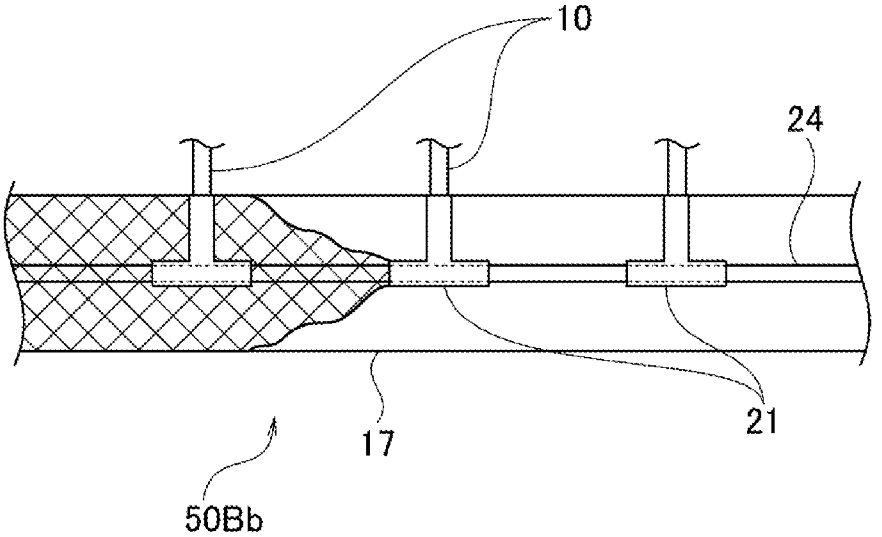
FIG. 12B is a diagram for schematically explaining detection in a detection path according to modification example 2 of the third embodiment.

The filter-press filter-cloth damage detection device 50Bb according to modification example 2 of the third embodiment will be described. Description of the components the same as or similar to those of the third embodiment is omitted. FIG. 12B illustrates modification example 2 of the third embodiment including a flow-down guide pipe 21 at each connection portion 19 in the collection pipe 15. In modification example 2 of the third embodiment, the detection path 17 in which filtrate is detected by the detection device 18B is also the collection pipe 15, as in the third embodiment. The flow-down guide pipe 21 is a T-shaped pipe having a diameter smaller than the collection pipe 15. The flow-down guide pipe 21 is connected to each connection portion 19 in the collection pipe 15, and the probe 24 of the detection device 18B is inserted into these flow-down guide pipes 21. This configuration enables filtrate to be detected before the concentration of the filtrate becomes low, and thus, it is possible to detect a filtrate with a high concentration in the collection pipe 15, thereby making the detection more accurate. Since the directions of the openings of the flow-down guide pipe 21 are aligned with the upstream and downstream directions of the collection pipe 15, one probe 24 can detect the filtrate in all the flow-down guide pipes 21 arranged in a row.

Figure 13:
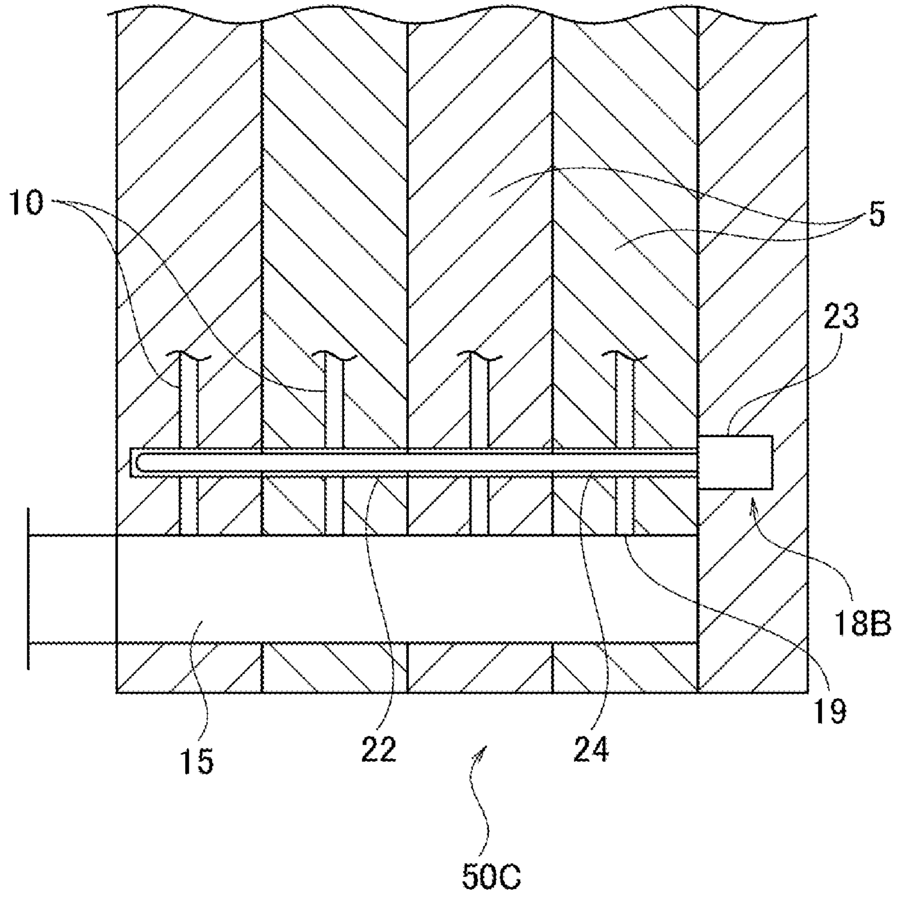
FIG. 13 is a diagram for schematically explaining detection in a detection path according to the fourth embodiment.

The filter-press filter-cloth damage detection device 50C according to the fourth embodiment will be described. FIG. 13 is a diagram for schematically explaining the filter-press filter-cloth damage detection device 50C configured to perform detection in a detection path 22. Description of the components the same as or similar to those of the third embodiment is omitted. In the fourth embodiment, unlike the detection path 17 of the third embodiment, a detection path 22 is formed to extend in the front-rear direction and communicate with a portion of each filtrate passage 10 preceding the collection pipe 15. As with the collection pipe 15, the entire detection path 22 is formed when the filter plates 5 are closed. The main body 23 of the detection device 18B is fixed to the movable head 8 and located at one end (the rear portion) of the detection path 22. The probe 24 extends in the detection path 22 from the main body 23 (the one end of the detection path 22) to near the other end (the front portion) of the detection path 22 toward the front frame 2. The detection path 22 is straight and has a smaller diameter than the collection pipe 15, and the end of detection path 22 is closed to be a dead end. At and near the connection point between each filtrate passage 10 and the detection path 22, filtrate flows in a direction orthogonal to the detection path 22. Thus, it is less likely that the filtrate in the detection path 22 flows in the directions to the adjacent filtration chambers 9, and even if there is a flow of filtrate in the detection path 22, the turbidity of filtrate near the filtrate passage 10 can be high. This configuration in the fourth embodiment enables a filtrate with a high turbidity to be detected at and near the connection point between each filtrate passage 10 and the detection path 22. Thus, it is possible to accurately detect the position at which the concentration of filtrate is high by using the pulses transmitted in a direction orthogonal to the flow-down direction of filtrate.

Note that the probe 24 of the detection device 18B can be selected as necessary, for example, from one in the form of a rod, one in the form of a rope, and the like. When the probe 24 is installed to extend in the detection path 22, the probe 24 may be supported as appropriate within a range that does not interfere with the detection.

In the first to fourth embodiments, detection of filtrate is performed in a pressurized supply process in which untreated liquid OL is supplied to the filtration chambers 9 under a pressure and in a squeezing process in which dehydrated cakes in the filtration chambers 9 are squeezed with diaphragms or the like after the pressurized supply process. When the detection path 17 or 22 is filled with filtrate, the detection device 18 transmits irradiation waves IW, or the main body 23 of the detection device 18B transmits pulses into the probe 24. In the pressurized supply process and the squeezing process, the amount of filtrate decreases over time. Hence, a configuration in which the detection is performed only for a prescribed time after each process starts is possible. Note that the interval between the times when the detection device 18 or 18B transmits irradiation waves IW or pulses is set in advance.

The filter-press filter-cloth damage detection devices 50, 50A, 50B, and 50C according to the first to fourth embodiments are capable of accurate detection by using the reflection of irradiation waves IW due to suspended matter in filtrate or the reflection of pulses due to the difference in permittivity and also capable of determining which one of the filtration chambers 9 arranged in a row the filter cloth 6 from which suspended matter is being discharged belongs to, in other words, the position of the damaged filter cloth 6. Thus, the filter-press filter-cloth damage detection devices 50, 50A, 50B, and 50C are very useful for devices for detecting damage of a filter cloth of a multi-chamber filter press for water supply sludge, sewage sludge, industrial waste water sludge, and the like.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

The invention claimed is:

1. A filter-press filter-cloth damage detection device for a filter press in which a filtrate produced by solid-liquid separation operation of a filter cloth nipped between filter plates is discharged into a collection pipe via a filtrate passage of each of the filter plates, the filter-press filter-cloth damage detection device comprising:

a detection path that extends in a straight line and to which the filtrate discharged from each of filtration chambers formed between adjacent filter plates is collected; and a detection device configured to transmit, from an end portion of the detection path, an irradiation wave or a pulse that reflects on an interface between a clear filtrate and a filtrate with a prescribed turbidity, convert a propagation time from the transmission until reception of a reflected wave into a distance, and output the distance, wherein the detection device includes:

a main body located at the end portion of the detection path; and a probe extending in the detection path from the main body, and the main body is configured to transmit the pulse into the probe.

2. The filter-press filter-cloth damage detection device according to claim 1, wherein each of the filter plates has a discharge port, and the detection path is the collection pipe defined by the discharge ports connected to one another in an arrangement direction of the filter plates with the filter plates being closed, and the detection device is configured to transmit the irradiation wave and provided at an upstream end of the detection path which is on an upstream side of the filtrate flowing down the detection path.

3. The filter-press filter-cloth damage detection device according to claim 1, wherein the detection path is the collection pipe provided beside the filter plates separately from the filter plates, and the detection device is configured to transmit the irradiation wave and provided at an upstream end of the detection path which is on an upstream side of the filtrate flowing down the detection path.

4. The filter-press filter-cloth damage detection device according to claim 1, wherein the detection path communicates with a portion of the filtrate passage of each of the filter plates with the filter plates being closed.

5. The filter-press filter-cloth damage detection device according to claim 2, wherein the detection device is configured to transmit the irradiation wave such that the irradiation wave passes at a position closer to a connection portion between the detection path and each filtrate passage than a center of the detection path.

6. The filter-press filter-cloth damage detection device according to claim 3, wherein the detection device is configured to transmit the irradiation wave such that the irradiation wave passes at a position closer to a connection portion between the detection path and each filtrate passage than a center of the detection path.

7. The filter-press filter-cloth damage detection device according to claim 2, further comprising a flow-down prevention plate located on an upstream side of a connection portion between the detection path and each filtrate passage in the detection path, the flow-down prevention plate allowing the irradiation wave to pass therethrough.

8. The filter-press filter-cloth damage detection device according to claim 3, further comprising a flow-down prevention plate located on an upstream side of a connection portion between the detection path and each filtrate passage in the detection path, the flow-down prevention plate allowing the irradiation wave to pass therethrough.

9. The filter-press filter-cloth damage detection device according to claim 2, further comprising a flow-down guide pipe at a connection portion between the detection path and each filtrate passage in the detection path, wherein the flow-down guide pipe is a T-shaped pipe having first and second openings facing an upstream direction and a downstream direction of the collection pipe, respectively, and the detection device is configured to transmit the irradiation wave such that the irradiation wave passes through the first and second openings.

10. The filter-press filter-cloth damage detection device according to claim 3, further comprising a flow-down guide pipe at a connection portion between the detection path and each filtrate passage in the detection path, wherein the flow-down guide pipe is a T-shaped pipe having first and second openings facing an upstream direction and a downstream direction of the collection pipe, respectively, and the detection device is configured to transmit the irradiation wave such that the irradiation wave passes through the first and second openings.

11. The filter-press filter-cloth damage detection device according to claim 1, wherein each of the filter plates has a discharge port, and the detection path is the collection pipe defined by the discharge ports connected to one another in an arrangement direction of the filter plates with the filter plates being closed, and the main body is provided at an upstream end of the detection path which is on an upstream side of the filtrate flowing down the detection path.

12. The filter-press filter-cloth damage detection device according to claim 1, wherein the detection path is the collection pipe provided beside the filter plates separately from the filter plates, and the main body is provided at an upstream end of the detection path which is on an upstream side of the filtrate flowing down the detection path.

13. The filter-press filter-cloth damage detection device according to claim 1, wherein the detection path communicates with a portion of the filtrate passage of each of the filter plates with the filter plates being closed.

14. The filter-press filter-cloth damage detection device according to claim 11, wherein the probe extends to pass at a position closer to a connection portion between the detection path and each filtrate passage than a center of the detection path.

15. The filter-press filter-cloth damage detection device according to claim 12, wherein the probe extends to pass at a position closer to a connection portion between the detection path and each filtrate passage than a center of the detection path.

16. The filter-press filter-cloth damage detection device according to claim 11, further comprising a flow-down guide pipe at a connection portion between the detection path and each filtrate passage in the detection path, wherein the flow-down guide pipe is a T-shaped pipe having first and second openings facing an upstream direction and a downstream direction of the collection pipe, respectively, and the probe is arranged to pass through the first and second openings.

17. The filter-press filter-cloth damage detection device according to claim 12, further comprising a flow-down guide pipe at a connection portion between the detection path and each filtrate passage in the detection path, wherein the flow-down guide pipe is a T-shaped pipe having first and second openings facing an upstream direction and a downstream direction of the collection pipe, respectively, and the probe is arranged to pass through the first and second openings.

18. The filter-press filter-cloth damage detection device according to claim 1, wherein the detection path extends in the straight line in an arrangement direction of the filter plates with the filter plates being closed.

19. The filter-press filter-cloth damage detection device according to claim 1, wherein the irradiation wave or the pulse is ultrasonic waves or microwaves.

* * * * *